(12) United States Patent
Lee et al.

(10) Patent No.: US 12,041,221 B2
(45) Date of Patent: Jul. 16, 2024

(54) APPARATUS FOR EVALUATING CAMERA MODULE AND OPERATING METHOD THEREOF

(71) Applicant: Samsung Electronics Co., Ltd., Suwon-si (KR)

(72) Inventors: Minhyuk Lee, Seoul (KR); Kichrl Park, Hwaseong-si (KR); Kaeul Lee, Cheonan-si (KR); Jisu Han, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 17/939,223

(22) Filed: Sep. 7, 2022

(65) Prior Publication Data

US 2023/0179759 A1    Jun. 8, 2023

(30) Foreign Application Priority Data

Dec. 2, 2021    (KR) .......................... 10-2021-0170550

(51) Int. Cl.
*H04N 17/00* (2006.01)
*H04N 5/76* (2006.01)
*H04N 23/73* (2023.01)

(52) U.S. Cl.
CPC ............. *H04N 17/002* (2013.01); *H04N 5/76* (2013.01); *H04N 23/73* (2023.01)

(58) Field of Classification Search
CPC ......... H04N 17/002; H04N 23/73; H04N 5/76
USPC .......................................................... 348/188
See application file for complete search history.

(56) References Cited

U.S. PATENT DOCUMENTS

| | | | |
|---|---|---|---|
| 9,239,642 B2 | 1/2016 | Son et al. | |
| 10,203,595 B2 | 2/2019 | Li et al. | |
| 2005/0280709 A1* | 12/2005 | Katayama | G01C 11/02 348/E13.016 |
| 2015/0237344 A1* | 8/2015 | Lee | H04N 17/002 348/187 |
| 2017/0195651 A1* | 7/2017 | Lee | G06V 20/52 |
| 2021/0203835 A1 | 7/2021 | Chen et al. | |

FOREIGN PATENT DOCUMENTS

| | | |
|---|---|---|
| EP | 1463342 A1 | 9/2004 |
| GB | 2460654 A | 12/2009 |
| KR | 100771827 B1 | 10/2007 |
| KR | 100808018 B1 | 2/2008 |
| KR | 10-2009-0039074 A | 4/2009 |

(Continued)

OTHER PUBLICATIONS

Partial European Search Report dated Apr. 18, 2023 for corresponding European Application No. 22202617.1.

*Primary Examiner* — John W Miller
*Assistant Examiner* — Omer Khalid
(74) *Attorney, Agent, or Firm* — Harness, Dickey & Pierce, P.L.C.

(57) ABSTRACT

A camera module evaluating apparatus includes a mobile device including a camera module, a transparent display device configured to display an object, a chart positioned farther from the mobile device than the transparent display device and configured to display a long-distance object, and a test device configured to perform an autofocusing (AF) test operation on the camera module when the camera module captures an image of the object.

5 Claims, 12 Drawing Sheets

(56) References Cited

FOREIGN PATENT DOCUMENTS

| | | |
|---|---|---|
| KR | 10-2014-0074746 A | 6/2014 |
| KR | 101442106 B1 | 9/2014 |
| KR | 102046569 B1 | 11/2019 |
| WO | WO-2013/153281 A1 | 10/2013 |
| WO | WO-2013153281 A1 * 10/2013 | ............. G03B 43/00 |

* cited by examiner

APPARATUS FOR EVALUATING CAMERA MODULE AND OPERATING METHOD THEREOF

CROSS-REFERENCE TO RELATED APPLICATION

This application claims benefit of priority to Korean Patent Application No. 10-2021-0170550 filed on Dec. 2, 2021 in the Korean Intellectual Property Office, the disclosure of which is incorporated herein by reference in its entirety.

BACKGROUND

The present inventive concepts relate to camera module evaluating apparatuses and operating methods thereof.

In general, a mobile device has a camera module having an image sensor embedded therein. As mobile cameras have replaced digital cameras, consumer demand for camera modules has also increased. There is demand for a camera evaluating apparatus for inspecting the quality of a mounted camera module. In the related art, a function of the camera module is evaluated by placing an object (a resolution chart) in front of the camera module and acquiring images at each distance for short-distance or long-distance image evaluation.

SUMMARY

Some example embodiments of the present inventive concepts are a camera module evaluating apparatus enabling an automated test operation and an operating method thereof.

According to some example embodiments of the present inventive concepts, an apparatus for evaluating a camera module may include: a mobile device configured to include the camera module; a transparent display device configured to display an object; a chart positioned farther from the mobile device than the transparent display device and configured to display a long-distance object; and a test device configured to perform an autofocusing (AF) test operation on the camera module based on the camera module capturing an image of the object.

According to some example embodiments of the present inventive concepts, a method of operating a camera module evaluating apparatus may include: setting a display ON/OFF time of a transparent display device for an object; setting a repetition number to an initial value; activating the transparent display device to display a first object; determining whether the first object is in focus in a camera module; increasing a pass count in response to a determination that the first object is in focus in the camera module; storing a pass/fail count value; setting the transparent display device to be transparent so that the first object disappears and subsequently determining whether a second object of a chart that is positioned farther from the camera module than the transparent display device and is visible to the camera module through the transparent display device is in focus in the camera module; increasing an AF pass count in response to a determination that the second object of the chart is in focus in the camera module; determining whether the repetition number is a maximum value; and outputting an AF pass count in response to a determination that the repetition number is the maximum value.

According to some example embodiments of the present inventive concepts, an apparatus for evaluating a camera module may include a mobile device including the camera module; a plurality of transparent display devices configured to display different objects; and a test device configured to perform a test operation based on the camera module capturing the different objects displayed by the plurality of transparent display devices.

According to some example embodiments of the present inventive concepts, an apparatus for evaluating a camera module may include: a mobile device including the camera module; a transparent display device configured to display a moving object; and a test device configured to perform a high dynamic range (HDR) test operation on the camera module, while the camera module performs a video recording operation on the moving object.

According to some example embodiments of the present inventive concepts, an operating method of operating a camera module evaluating apparatus may include: setting a display ON/OFF time of at least one transparent display device for an object; executing a camera application of a camera module; and testing the camera module using an object output to the at least one transparent display device.

BRIEF DESCRIPTION OF DRAWINGS

The above and other aspects, features, and advantages of the present inventive concepts will be more clearly understood from the following detailed description, taken in conjunction with the accompanying drawings, in which.

DETAILED DESCRIPTION

Figure 1:
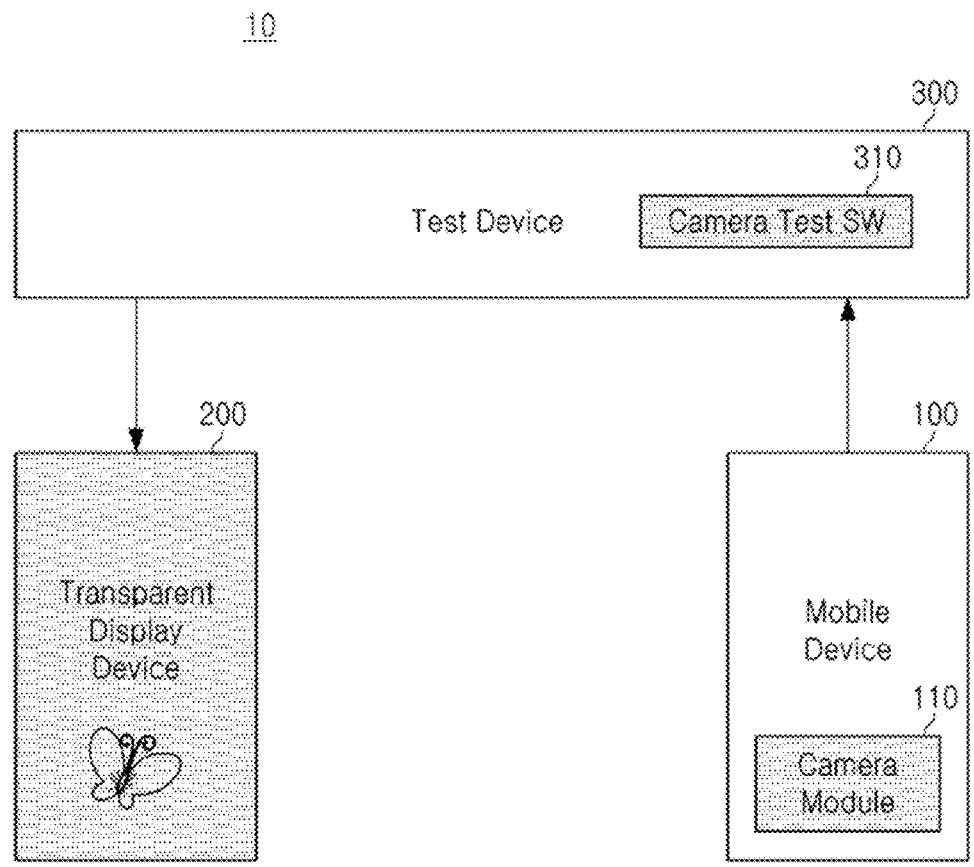
FIG. 1 is a view illustrating a camera module evaluating apparatus according to some example embodiments of the present inventive concepts.

Hereinafter, the present inventive concepts will be described clearly and in detail to the extent that a person skilled in the art may easily implement the same with reference to the drawings.

It will be understood that elements and/or properties thereof (e.g., structures, surfaces, directions, or the like), which may be referred to as being "perpendicular," "parallel," "coplanar," or the like with regard to other elements and/or properties thereof (e.g., structures, surfaces, directions, or the like) may be "perpendicular," "parallel," "coplanar," or the like or may be "substantially perpendicular," "substantially parallel," "substantially coplanar," respectively, with regard to the other elements and/or properties thereof.

Elements and/or properties thereof (e.g., structures, surfaces, directions, or the like) that are "substantially perpendicular" with regard to other elements and/or properties thereof will be understood to be "perpendicular" with regard to the other elements and/or properties thereof within manufacturing tolerances and/or material tolerances and/or have a deviation in magnitude and/or angle from "perpendicular," or the like with regard to the other elements and/or properties thereof that is equal to or less than 10% (e.g., a. tolerance of ±10%).

Elements and/or properties thereof (e.g., structures, surfaces, directions, or the like) that are "substantially parallel" with regard to other elements and/or properties thereof will be understood to be "parallel" with regard to the other elements and/or properties thereof within manufacturing tolerances and/or material tolerances and/or have a deviation in magnitude and/or angle from "parallel," or the like with regard to the other elements and/or properties thereof that is equal to or less than 10% (e.g., a. tolerance of ±10%).

Elements and/or properties thereof (e.g., structures, surfaces, directions, or the like) that are "substantially coplanar" with regard to other elements and/or properties thereof will be understood to be "coplanar" with regard to the other elements and/or properties thereof within manufacturing tolerances and/or material tolerances and/or have a deviation in magnitude and/or angle from "coplanar," or the like with regard to the other elements and/or properties thereof that is equal to or less than 10% (e.g., a. tolerance of ±10%).

It will be understood that elements and/or properties thereof may be recited herein as being "the same" or "equal" as other elements, and it will be further understood that elements and/or properties thereof recited herein as being "identical" to, "the same" as, or "equal" to other elements may be "identical" to, "the same" as, or "equal" to or "substantially identical" to, "substantially the same" as or "substantially equal" to the other elements and/or properties thereof. Elements and/or properties thereof that are "substantially identical" to, "substantially the same" as or "substantially equal" to other elements and/or properties thereof will be understood to include elements and/or properties thereof that are identical to, the same as, or equal to the other elements and/or properties thereof within manufacturing tolerances and/or material tolerances. Elements and/or properties thereof that are identical or substantially identical to and/or the same or substantially the same as other elements and/or properties thereof may be structurally the same or substantially the same, functionally the same or substantially the same, and/or compositionally the same or substantially the same.

It will be understood that elements and/or properties thereof described herein as being the "substantially" the same and/or identical encompasses elements and/or properties thereof that have a relative difference in magnitude that is equal to or less than 10%. Further, regardless of whether elements and/or properties thereof are modified as "substantially," it will be understood that these elements and/or properties thereof should be construed as including a manufacturing or operational tolerance (e.g., ±10%) around the stated elements and/or properties thereof.

While the term "same," "equal" or "identical" may be used in description of some example embodiments, it should be understood that some imprecisions may exist. Thus, when one element is referred to as being the same as another element, it should be understood that an element or a value is the same as another element within a desired manufacturing or operational tolerance range (e.g., ±10%).

When the terms "about" or "substantially" are used in this specification in connection with a numerical value, it is intended that the associated numerical value includes a manufacturing or operational tolerance (e.g., ±10%) around the stated numerical value. Moreover, when the words "about" and "substantially" are used in connection with geometric shapes, it is intended that precision of the geometric shape is not required but that latitude for the shape is within the scope of the disclosure. Further, regardless of whether numerical values or shapes are modified as "about" or "substantially," it will be understood that these values and shapes should be construed as including a manufacturing or operational tolerance (e.g., ±10%) around the stated numerical values or shapes. When ranges are specified, the range includes all values therebetween such as increments of 0.1%.

A camera module evaluating apparatus and an operating method thereof according to some example embodiments of the present inventive concepts may perform a reliable evaluation by securing the same and accurate test environment using a transparent display panel. In particular, the camera module evaluating apparatus and the operating method thereof of the present inventive concepts are useful for shortening a test time and establishing a test standard. In addition, the camera module evaluating apparatus and an operating method thereof according to some example embodiments of the present inventive concepts may build an automated test environment using a transparent display panel and control software.

FIG. 1 is a view illustrating a camera module evaluating apparatus 10 according to some example embodiments of the present inventive concepts. Referring to FIG. 1, the camera module evaluating apparatus 10 may include a mobile device 100, a transparent display device 200, and a test device 300.

The mobile device 100 may include a camera module 110. As used herein, a camera module may be interchangeably referred to as a "camera," a "camera device," or the like. The camera module 110 may be implemented to capture an image of an object (also referred to herein as simply capturing the object). The camera module 110 may include at least one lens and at least one image sensor. The camera module evaluating apparatus 10 may hold the mobile device 100, and thus the camera module 110, in a fixed position and orientation, particularly during operation of the camera module 110, the test device 300, and the transparent display device 200, to enable rapid, repeatable, and reliable test operation results. For example, the camera module evaluating apparatus 10 may include a clamp device into which the mobile device 100 is inserted and which is adjusted to secure the mobile device in a fixed position and orientation which aligns the camera module 110 to be configured to image objects displayed by the transparent display device 200 and/or any objects which may be visible through the transparent display device 200 when the transparent display device 200 is caused to be transparent.

The transparent display device 200 may be implemented to display an object for evaluation of the camera module 110. The transparent display device 200 may include a transparent display panel. A transparent display panel is a component changing various electrical information into visual information using a change in liquid crystal transmittance according to an applied voltage and transmits the changed visual information, and may include a lower plate in which a transparent thin film transistor (TFT) and a pixel electrode are arranged, an upper plate including a color filter a transparent common electrode for representing color, and a liquid crystal filling a gap between the two glass substrates.

The test device 300 may be implemented to control the transparent display device 200 for a test operation. In some example embodiments, the test operation may include an autofocus (AF) test operation, a Bokeh test operation, or a high dynamic range (HDR) test operation. Meanwhile, it should be understood that the test operation of the example embodiments are not limited thereto.

Also, the test device 300 may be implemented to obtain evaluation information according to the test operation from the mobile device 100. For example, in the test operation, the mobile device 100 may drive an application for driving the camera module 110. Result information of the test operation according to the driving of the application may be transmitted/output from the test device 300 for analysis.

The camera module evaluating apparatus 10 according to some example embodiments of the present inventive concepts may automatically evaluate the camera module according to a particular (or, alternatively, predetermined) method under various conditions by outputting an object to the transparent display device 200.

Figure 2:
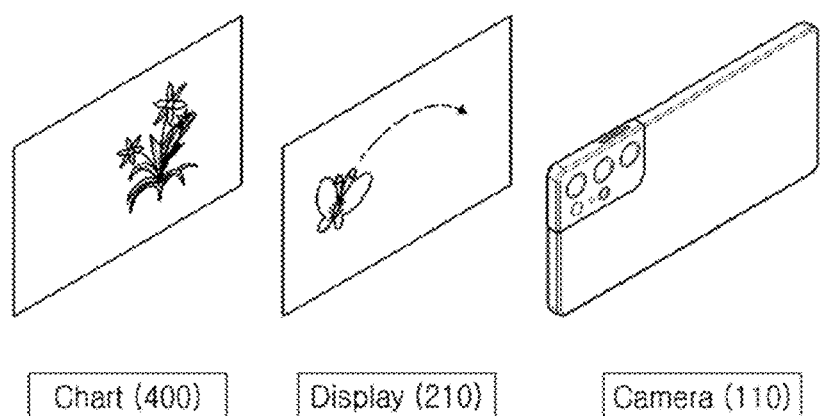
FIG. 2 is a diagram conceptually illustrating an autofocusing (AF) test operation of a camera module evaluating apparatus according to some example embodiments of the present inventive concepts.

FIG. 2 is a diagram conceptually illustrating an AF test operation of the camera module evaluating apparatus 10 according to some example embodiments of the present inventive concepts. Referring to FIG. 2, the camera module 110 of the mobile device 100, the transparent display panel 210 of the transparent display device 200, and a chart 400 are disposed for the AF test operation. Here, the chart 400 may include a distant object. In some example embodiments, the chart 400 may be an electronic chart. For example, the chart 400 may be implemented as a display device.

As illustrated in FIG. 2, for the AF test operation, the transparent display panel 210 may be disposed near the camera module 110, and the chart 400 may be disposed at a distance from the camera module 110. The camera module 110 may focus on an object output on (e.g., displayed on, displayed by, etc.) the transparent display panel 210 at a short distance, and then focus on the object of the chart 400 after adjusting the transparent display panel 210 to be transparent so that the chart 400 is visible to the camera module 110 through the transparent display panel 210. The test device 300 may monitor an image capturing operation of the camera module 110 in the aforementioned process, and may determine an AF time and AF pass/fail according to a corresponding result. In particular, the test device 300 may automatically control the object output on the transparent display panel 210.

Figure 3:
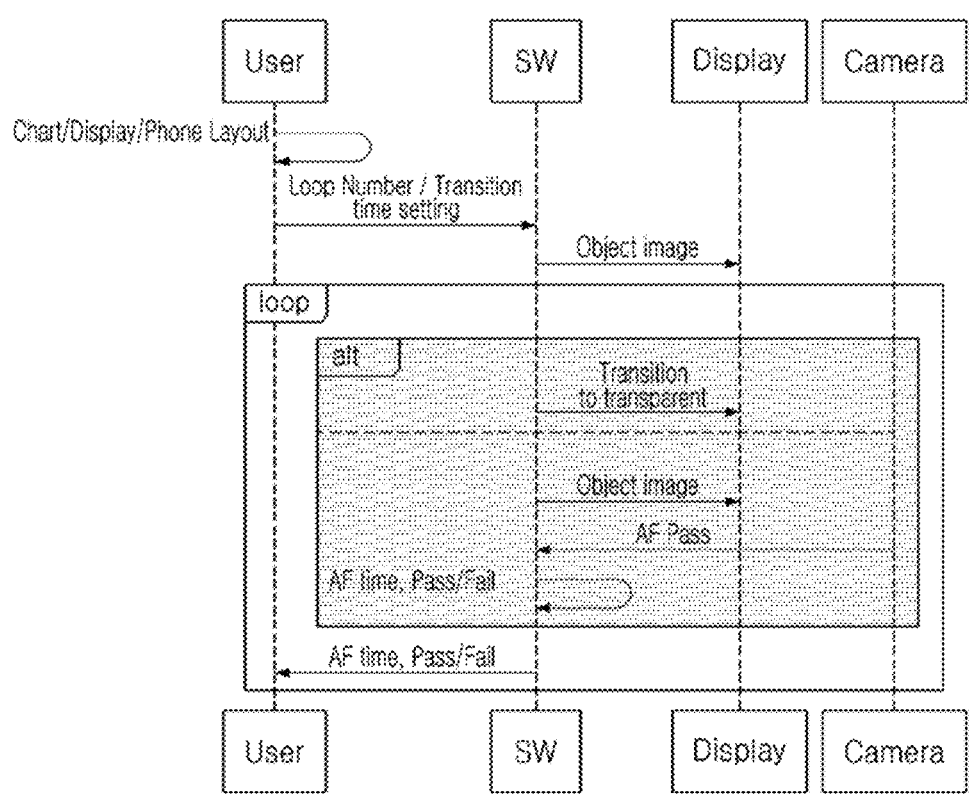
FIG. 3 is a flowchart illustrating a process of performing an AF test operation in a camera module evaluating apparatus 10 according to some example embodiments of the present inventive concepts.

FIG. 3 is a flowchart illustrating a process of performing an AF test operation in the camera module evaluating apparatus 10 according to some example embodiments of the present inventive concepts.

The user may arrange the chart 400, the transparent display panel 210, and the mobile device 100 as illustrated in FIG. 2. The user may be implemented to perform basic settings for a test operation in a software 310 of the test device 300. For example, the user may set a repetition number of the AF test (a maximum loop value), a transition time, a limit time, an object image, an object reproduction time, and the like. The software 310 may output an image of the object to the transparent display panel 210. The test device 300 may include a processor for driving the software 310 and a memory device for storing the software 310.

The mobile device 100 may activate an application related to the camera module. The camera application is executed and a test operation is started. That is, the transparent display panel 201 is activated. An initial display state is an object image. When the transparent display panel 201 is activated, the software 310 starts video recording and runs a timer. During an object reproduction time, AF pass information of the camera may be polled. When Auto Force is activated, AF passes may be counted. When the object reproduction time expires, AF failures may be counted. At the same time, the AF pass/fail counting time may be stored. By removing the object image, the transparent display state may be maintained during the transition time. During the transition time, the AF pass information of the camera may be polled. Thereafter, the AF test loop may proceed according to the process described above.

For each test loop, at a transition time determined by an event, the software 310 may transition the transparent display panel 210 to be transparent. Thereafter, the software 310 may output the object image to the transparent display panel 210 (e.g., to be displayed by the transparent display panel 210). Thereafter, the mobile device 100 may transmit the AF test result to the test device 300. The test device 300 may store the AF test result. Here, the AF test result may include AF pass/fail status, AF test average time, AF pass/fail counting time, and a video file (result of video recording). Here, the AF test average time is a value obtained by dividing a total AF test time of the repeated loop by the number of repetitions. Thereafter, the test device 300 may notify the user of the AF test result.

Figure 4:
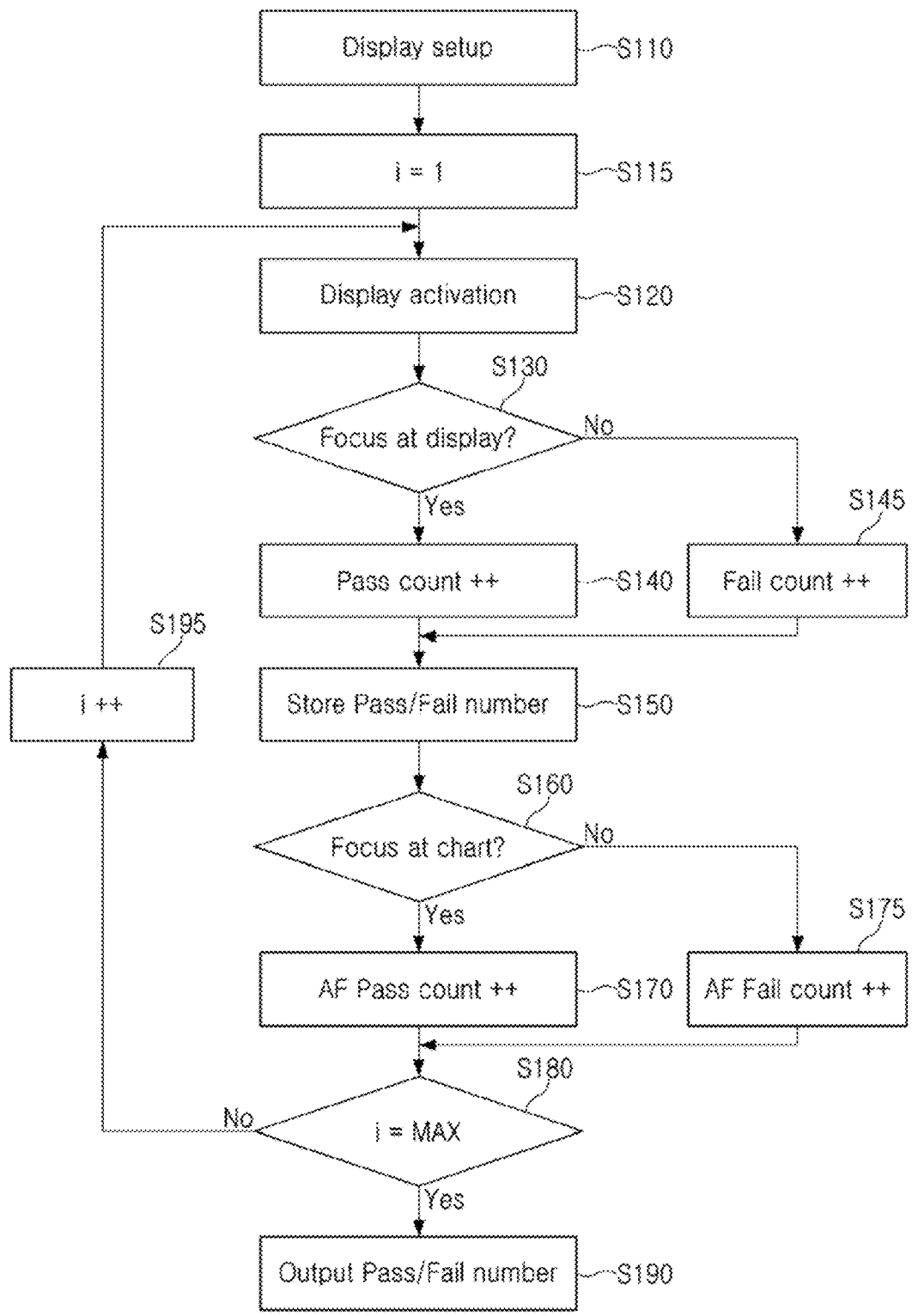
FIG. 4 is a flowchart illustrating an operating method of a test device according to some example embodiments of the present inventive concepts.

FIG. 4 is a flowchart illustrating an operating method of the test device 300 according to some example embodiments of the present inventive concepts. Referring to FIG. 4, an AF test operation of the test device 300 may be performed as follows.

A chart-display-mobile device 100 of the test device 300 may be set by the user, and a display ON/OFF time and the number (MAX) of times to repeat the test may be set (S110). The number of repetitions i may be set to an initial value of '1' (S115). The transparent display panel 210 may be activated (S120). The camera module 110 may determine whether an object of the transparent display panel 210 is focused (S130). Restated, the camera module 110 may capture an image of the object of the transparent display panel 210 and determine whether the imaged object is in focus, such that the transparent display panel 210 is focused. When the transparent display panel 210 is focused, the pass count may be increased (S140). Meanwhile, if the transparent display panel 210 is not focused, the fail count may be increased (S145). The pass/fail number may be stored (S150). Thereafter, the camera module 110 may determine whether the object of the chart 400 is focused (S160). Restated, the camera module 110 may capture an image of the object of the chart 400 and determine whether the imaged object is in focus, such that the chart 400 is focused. If the chart 400 is focused, the AF pass count may be increased (S170). Meanwhile, if the chart 400 is not focused, the AF fail count may be increased (S175). Thereafter, it may be determined whether the number of repetitions i is a maximum value MAX (S180). The AF pass/fail count may be stored. If the number of repetitions i is the maximum value MAX, the number of AF passes/fails may be output (S190). Meanwhile, if the number of repetitions (i) is not the maximum value MAX, the number of repetitions i may be increased by the set value '1' (S195), and operation S120 may be performed.

Meanwhile, the camera module evaluating apparatus 10 according to some example embodiments of the present inventive concepts are applicable to an HDR motion test operation.

Figure 5:
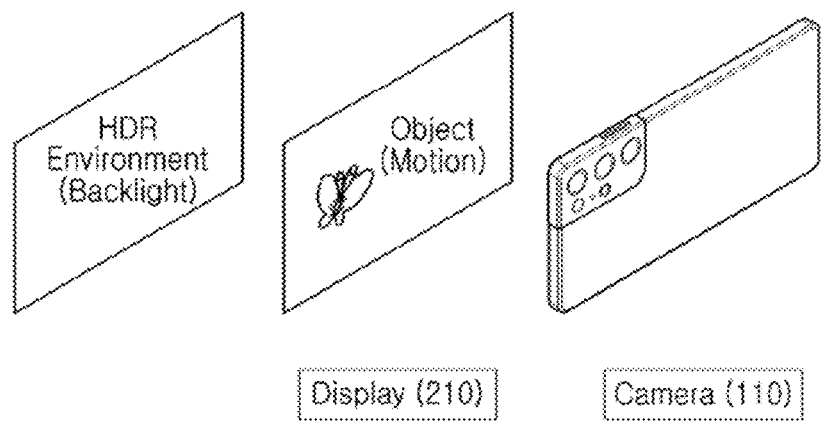
FIG. 5 is a diagram conceptually illustrating a high dynamic range (HDR) motion test operation of a camera module evaluating apparatus according to some example embodiments of the present inventive concepts.

FIG. 5 is a diagram conceptually illustrating an HDR motion test operation of the camera module evaluating apparatus 10 according to some example embodiments of the present inventive concepts. In general, HDR motion evaluation proceeds with a moving object in an HDR environment (an environment with high dynamic range, for example, backlight). As illustrated in FIG. 5, the transparent display panel 210 may display a moving object.

Figure 6:
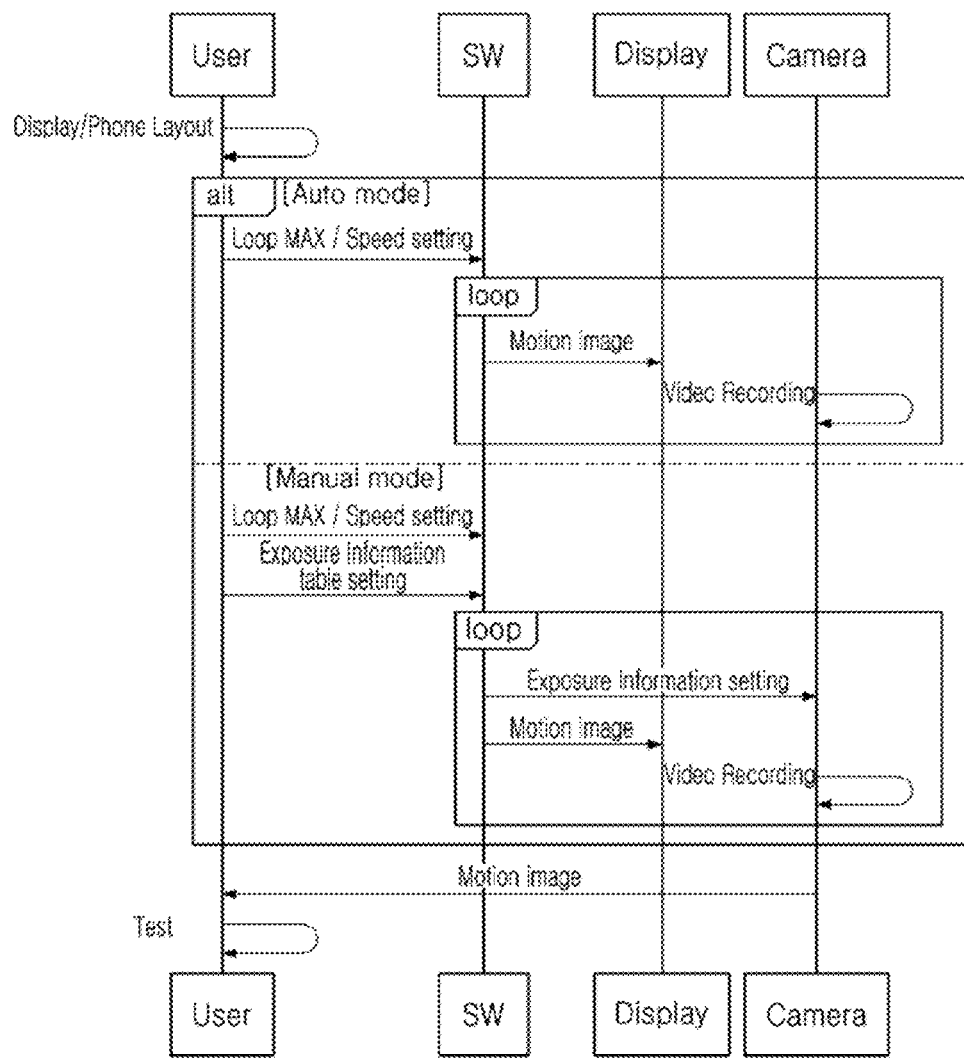
FIG. 6 is a flowchart illustrating an HDR test process of a camera module evaluating apparatus according to some example embodiments of the present inventive concepts.

FIG. 6 is a flowchart illustrating an HDR test process of the camera module evaluating apparatus 10 according to some example embodiments of the present inventive concepts.

An HDR test operation is classified into an auto mode test operation and a manual mode test operation. Auto mode is a mode for testing an image to which an exposure ratio calculated automatically by an AP is applied. Manual mode is a mode for testing images to which an exposure ratio arbitrarily determined by the user is applied. Here, the exposure ratio refers to a ratio of various exposure times (long, middle, short, etc.).

As illustrated in FIG. 6, in the auto mode test operation, the number of repetitions and an image rate may be set by the user. The software 310 may control a moving image to be displayed on the transparent display panel 210. The camera module 110 may capture a moving image of the transparent display panel 210. This process may be repeated.

In the manual mode test operation, the number of repetitions and the image rate may be set, and an exposure information table may be set at the same time. The software 310 may control to set exposure information of the camera module 110. Thereafter, the software 310 may control to display the moving image on the transparent display panel 210. The camera module 110 may capture the moving image.

Video stored in the auto mode test operation or manual mode test operation may be delivered to the user. Users may complete the HDR test by viewing the stored video.

Meanwhile, the camera module evaluating apparatus according to some example embodiments of the present inventive concepts may be implemented with a plurality of transparent display devices.

Figure 7:
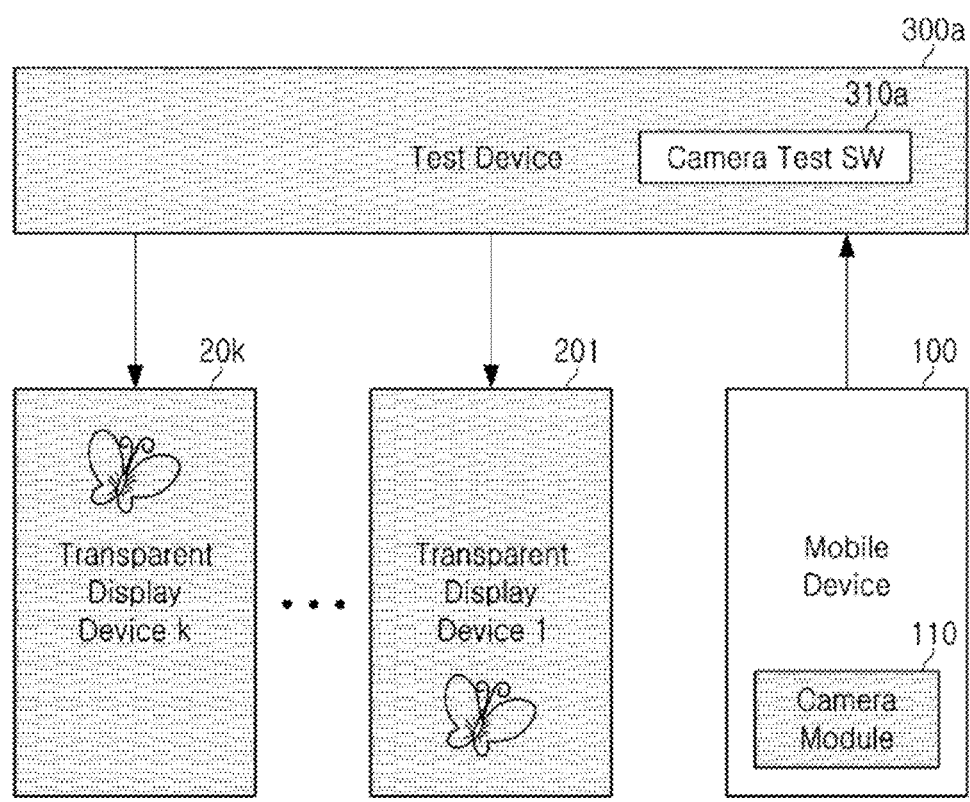
FIG. 7 is a view illustrating a camera module evaluating apparatus according to some example embodiments of the present inventive concepts.

FIG. 7 is a view illustrating a camera module evaluating apparatus 20 according to some example embodiments of the present inventive concepts. Referring to FIG. 7, the camera module evaluating apparatus 20 includes a first transparent display device 201 to a k-th transparent display device 20k as compared with the camera module evaluating apparatus 10 illustrated in FIG. 1. Here, k is an integer greater than or equal to 2;

In some example embodiments, the first transparent display device 201 may be spaced apart from the mobile device 100 by a first distance. In some example embodiments, the k-th transparent display device 20k may be spaced apart from the mobile device 100 by a second distance. Here, the second distance may be different from the first distance.

A software 310a of the test device 300a may control the first to k-th transparent display devices 201, . . . , 20k for a test operation.

Meanwhile, the camera module evaluating apparatus 20 according to some example embodiments of the present inventive concepts may be used for a Bokeh test operation. In general, the Bokeh test operation is photography, which creates a blurring effect in an out-of-focus portion of an image.

Figure 8:
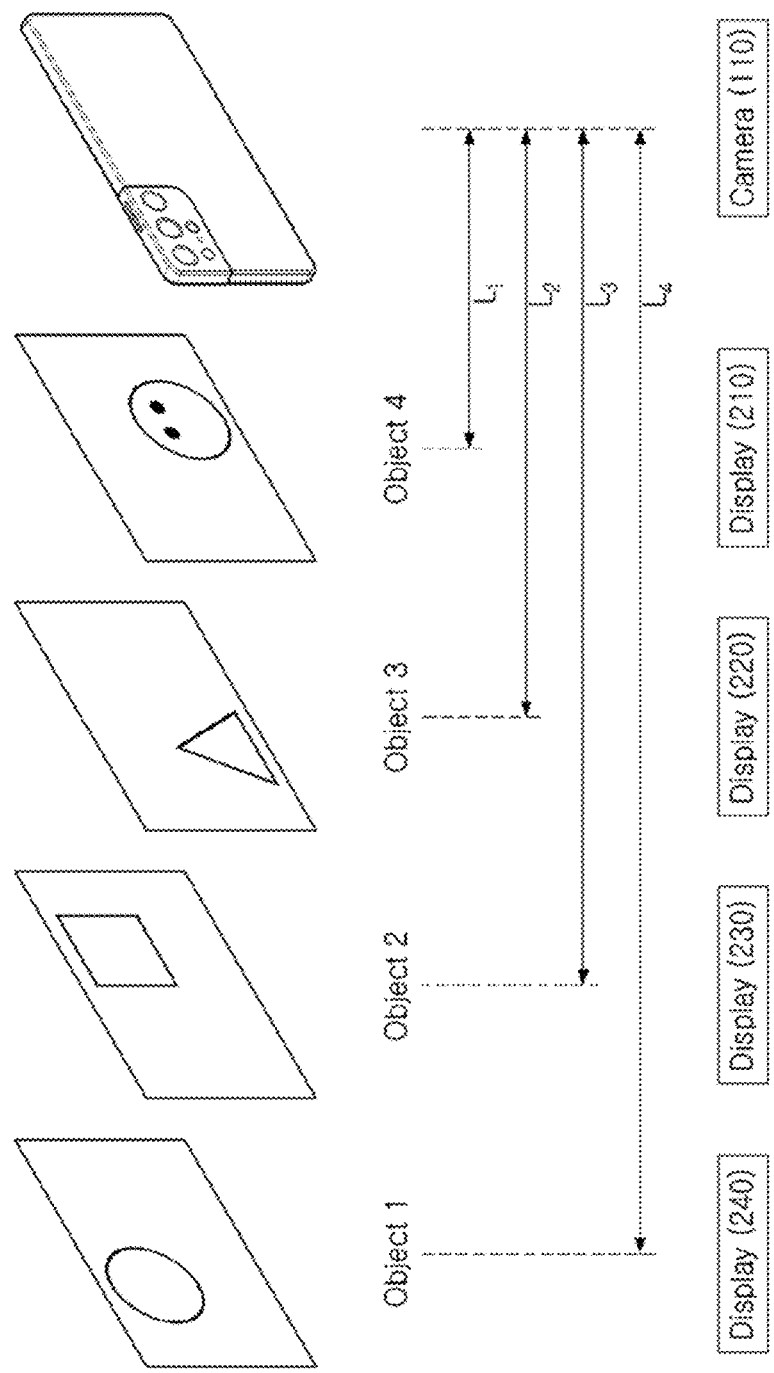
FIG. 8 is a view illustrating a Bokeh test process of a camera module evaluating apparatus according to some example embodiments of the present inventive concepts.

FIG. 8 is a view illustrating a Bokeh test process of the camera module evaluating apparatus 10 according to some example embodiments of the present inventive concepts. As illustrated in FIG. 8, four transparent display panels 210, 220, 230, and 240 may be used for the Bokeh test operation. In some example embodiments, each of the transparent display panels 210, 220, 230, and 240 and the camera module 110 may be spaced apart by different distances L1, L2, L3, and L4. As illustrated in FIG. 8, objects having different shapes may be displayed on the transparent display panels 210, 220, 230, and 240, respectively.

The camera may be set to have a shallow depth of field (a narrow focus area) by adjusting a position of a lens and a width of the aperture. In a mobile device, it may be implemented by synthesizing an image mainly in software. The performance of the Bokeh may be tested by a difference in contrast between the image of the object at an in-focus position and the rest of the position. For example, in a camera mode set to focus only on a first object output on the fourth transparent display panel 240, an image displayed on the first object is captured clearly, but images of the remaining objects should be blurred.

The test device 300a may output an object image as illustrated in FIG. 8 and set a focal length of the camera module 110. Thereafter, it is possible to check whether the image captured by the camera module 110 is properly separated into a focused region and a blurred region and whether or not artifacts occur in a boundary region.

Figure 9A:
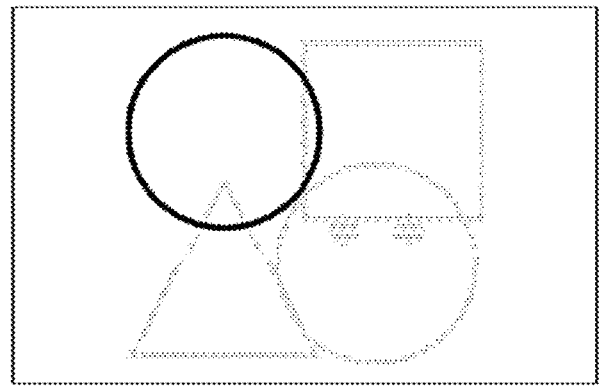
FIGS. 9A and 9B are diagrams illustrating a camera image according to a Bokeh test operation.
Figure 9B:
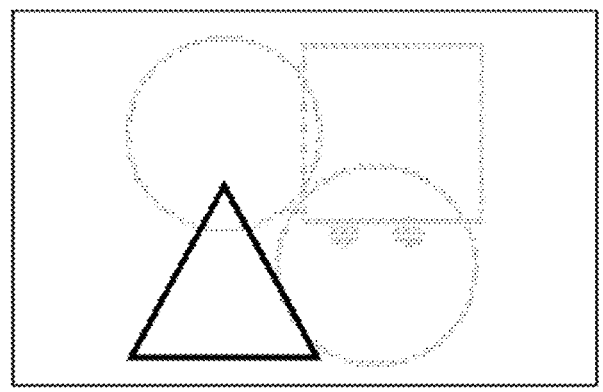

FIGS. 9A and 9B are diagrams illustrating a camera image according to a Bokeh test operation. Referring to FIG. 9A, a first object (the circular shape) is clear and the other objects are blurred. Referring to FIG. 9B, a second object (the triangular shape) is clear and the other objects are blurred.

Figure 10:
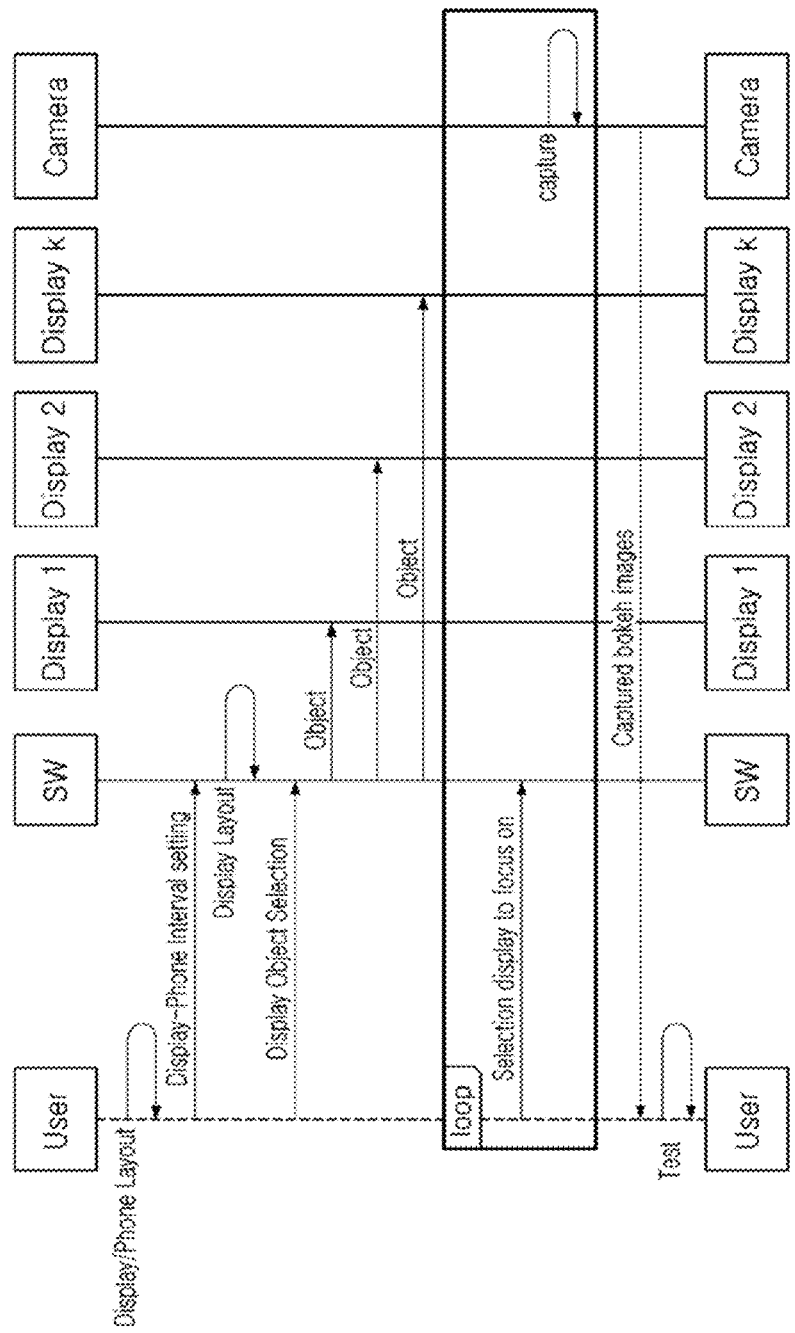
FIG. 10 is a flowchart illustrating a Bokeh test process of a camera module evaluating apparatus according to some example embodiments of the present inventive concepts.

FIG. 10 is a flowchart illustrating a Bokeh test process of the camera module evaluating apparatus 20 according to some example embodiments of the present inventive concepts. Referring to FIG. 10, the user may arrange transparent display panels and a mobile device for a Bokeh test operation. The user may set a display-mobile device interval in the software 310a of the test device 300. A transparent display panel is disposed, and the user may select an object to be displayed in the test device 300. Thereafter, objects respectively corresponding to the display panels 210, 220, 230, and 240 may be output (e.g., displayed) under the control of the software 310a.

In each loop, the user may select a transparent display panel to focus on. Thereafter, the camera module 110 may image (e.g., capture, capture one or more images of, etc.) objects output respectively from the display panels 210, 220, 230, and 240. The user may test the Bokeh by checking the captured image.

Figure 11:
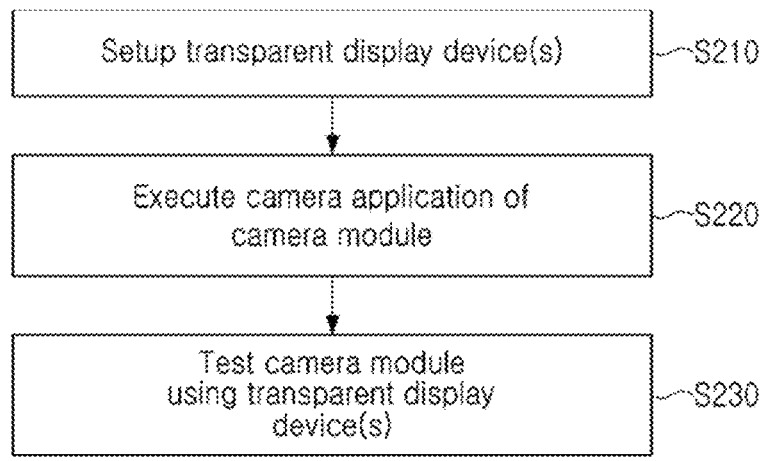
FIG. 11 is a flowchart illustrating an operating method of operating a camera module evaluating apparatus according to some example embodiments of the present inventive concepts.

FIG. 11 is a flowchart illustrating an operating method of operating a camera module evaluating apparatus according to some example embodiments of the present inventive concepts. Referring to FIGS. 1 to 11, the operation of the camera module evaluating apparatus may proceed as follows.

At least one transparent display device (e.g., 200 in FIG. 1) may be set to display an object during a test operation (S210). A camera application may be executed (S220). Thereafter, a test operation on the camera module 110 may be performed using the transparent display device 200 (S230).

In some example embodiments, the camera module may be mounted on a mobile device or on a test-only board. In some example embodiments, as the test operation, at least one of an AF test, a high dynamic range (HDR) test, or a Bokeh test may be performed. In some example embodiments, the image captured by the camera module may be output to a test device for analysis.

Meanwhile, a test operation for a camera module built in a mobile device is described in FIGS. 1 to 11. The present inventive concepts are not necessarily limited thereto. The present inventive concepts are also applicable to a development stage of the camera module.

Figure 12:
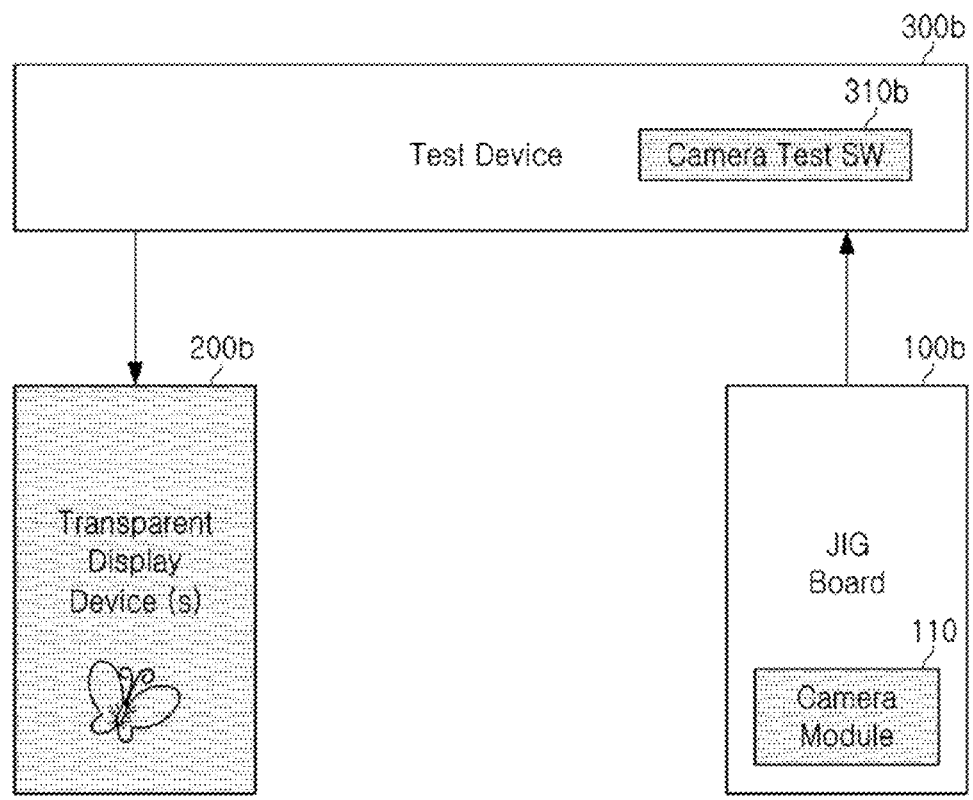
FIG. 12 is a view illustrating a camera module evaluating apparatus according to some example embodiments of the present inventive concepts.

FIG. 12 is a view illustrating a camera module evaluating apparatus 30 according to some example embodiments of the present inventive concepts. Referring to FIG. 12, the camera module evaluating apparatus 30 may include a jig board 100*b*, at least one transparent display device 200*b*, and a test device 300*b*.

The jig board 100*b* may be a test-only board for camera module development. The jig board 100*b* may be implemented to mount the camera module 110.

The test device 300*b* may be connected to the jig board 100*b* and include a camera test software 310*b*. Here, the camera test software 310*b* may control the transparent display device 200*b* to perform various test operations on the camera module 110, and store and output information on the test operation.

Meanwhile, the mobile device according to some example embodiments of the present inventive concepts may be a folded mobile device.

Figure 13A:
FIGS. 13A and 13B are diagrams illustrating a folded mobile device.
Figure 13B:
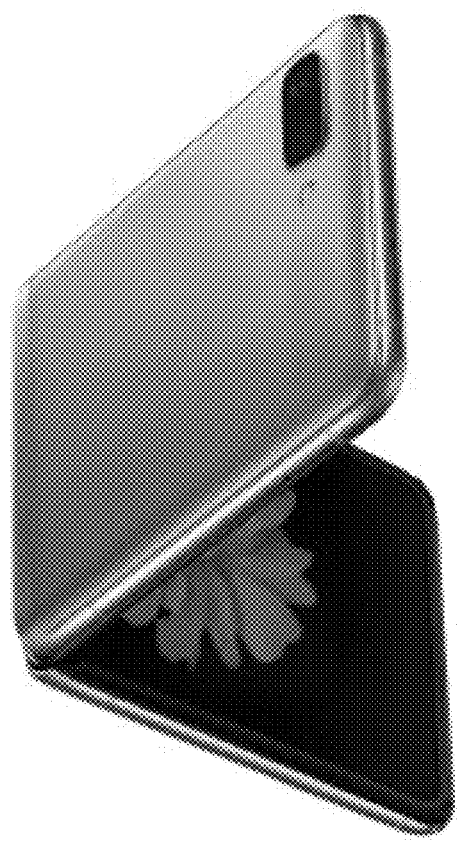

FIGS. 13A and 13B are diagrams illustrating a folded mobile device. The folded mobile device may have at least two or more surfaces that are not located on the same horizontal plane, when bent by the user. Here, bending is used to have the same or similar meaning as folding. The folded mobile device may include the camera module described above with reference to FIGS. 1 to 10.

Meanwhile, a plurality of camera modules according to some example embodiments of the present inventive concepts may be applied to an electronic device.

Figure 14:
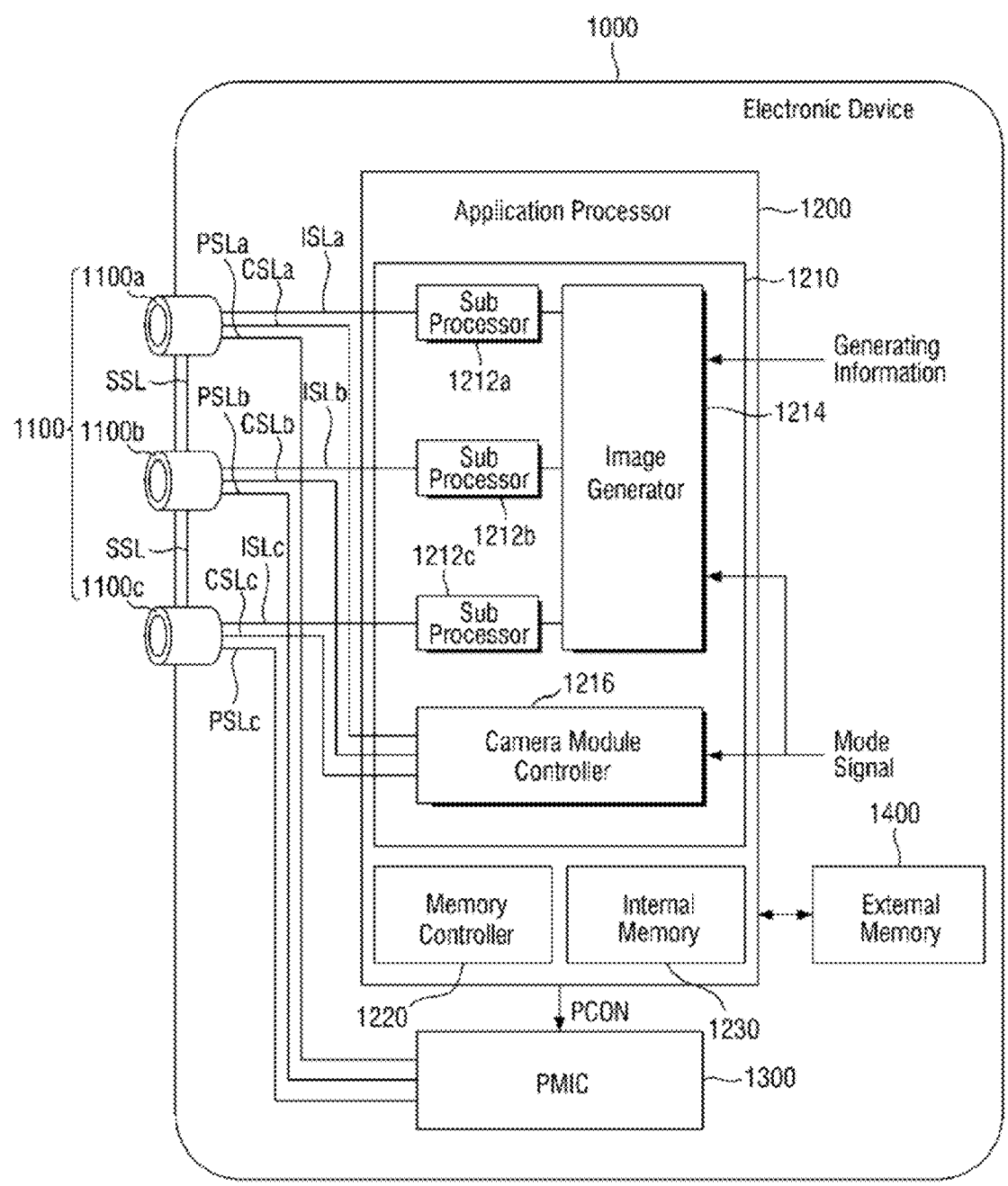
FIG. 14 is a diagram illustrating an electronic device having a multi-camera module according to some example embodiments of the present inventive concepts.

FIG. 14 is a diagram illustrating an electronic device having a multi-camera module according to some example embodiments of the present inventive concepts. Referring to FIG. 14, an electronic device 1000 may include a camera module group 1100, an application processor 1200, a power management integrated circuit (PMIC) 1300, and an external memory 1400.

The camera module group 1100 may include a plurality of camera modules 1100*a*, 1100*b*, and 1100*c*. As used herein, a camera module may be interchangeably referred to as a "camera," a "camera device," or the like. Although FIG. 14 shows some example embodiments in which three camera modules 1100*a*, 1100*b*, and 1100*c* are disposed, the example embodiments are not limited thereto. In some example embodiments, the camera module group 1100 may be modified to include only two camera modules. Also, in some example embodiments, the camera module group 1100 may be modified to include n (n is a natural number equal to or greater than 4) camera modules. Each of the camera modules 1100*a*, 1100*b*, and 1100*c* of the present inventive concepts may be implemented to perform a test operation by imaging an object of the transparent display device through an external test device as described above with reference to FIGS. 1 to 12.

Figure 15:
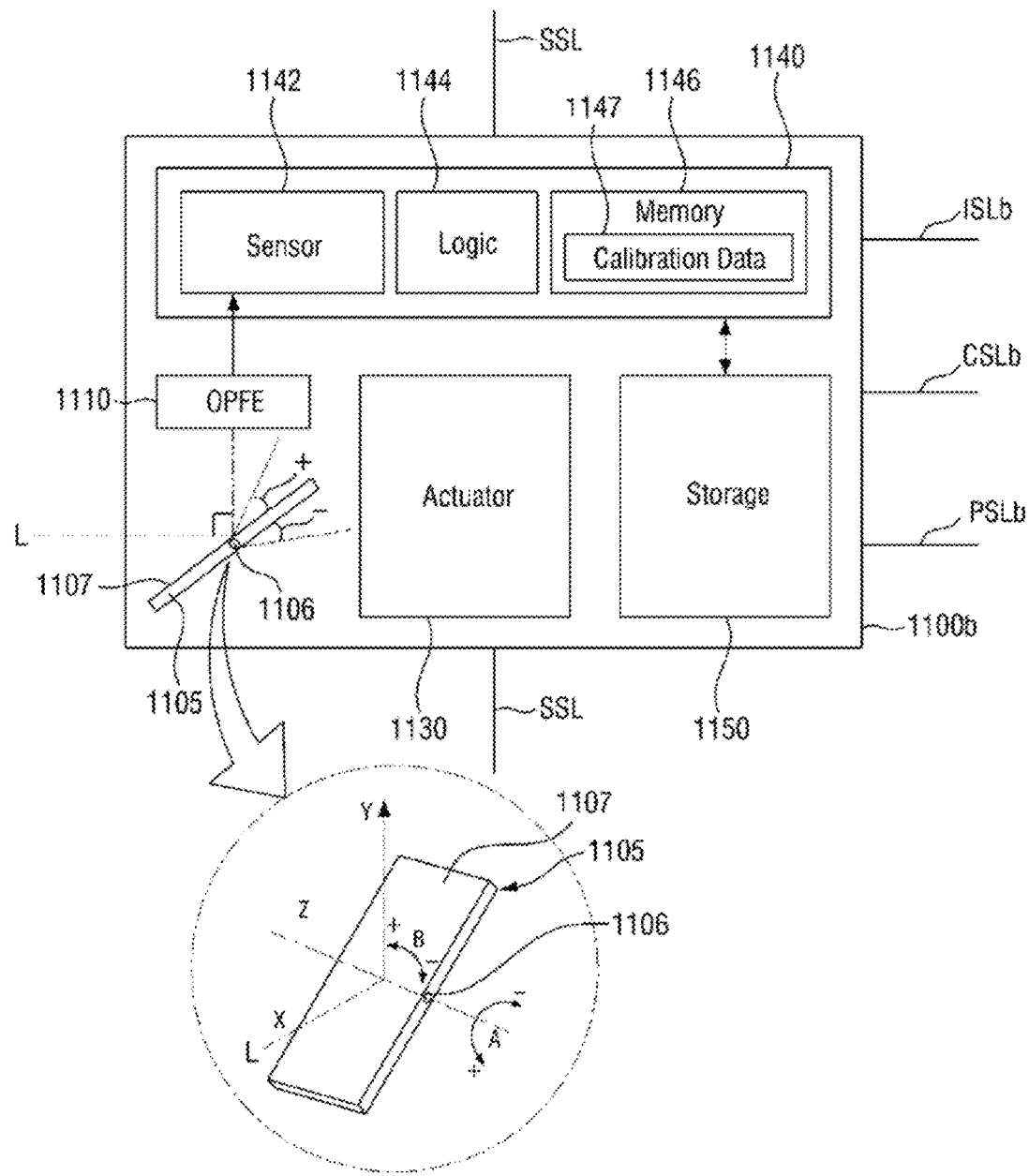
FIG. 15 is a view illustrating a detailed configuration of a camera module illustrated in FIG. 14.

FIG. 15 is a view illustrating a detailed configuration of the camera module 1100*b* illustrated in FIG. 14. The following description may be equally applied to the other camera modules 1100*a* and 1100*b* according to example embodiments. Referring to FIG. 15, the camera module 1100*b* may include a prism 1105, an optical path folding element (OPFE) 1110, an actuator 1130, an imaging device 1140, and a storage device 1150.

The prism 1105 may include a reflective surface 1107 of a light reflective material to change a path of light L incident from the outside. In some example embodiments, the prism 1105 may change the path of the light L incident in a first direction X to a second direction Y, perpendicular to the first direction X. In addition, the prism 1105 may change the path of light L incident in the first direction X to the second direction Y, perpendicular thereto, by rotating the reflective surface 1107 of the light reflective material in a direction A based on a central axis 1106 or rotating the central axis 1106 in a direction B. Here, the OPFE 1110 may also move in a third direction Z, perpendicular to the first direction X and the second direction Y. In some example embodiments, including the example embodiments as illustrated in FIG. 15, a maximum rotation angle of the prism 1105 in the direction A may be 15 degrees or less in a positive (+) A direction and may be greater than 15 degrees in a negative (−) A direction, but example embodiments are not limited thereto. In some example embodiments, the prism 1105 may move in the positive (+) or negative (−) B direction by about 20 degrees, or from 10 degrees to 20 degrees, or from 15 degrees to 20 degrees, and here, the prism 1105 may move at the same angle in the positive (+) or negative (−) direction B or may move to a nearly similar angle within a range of 1 degree. In some example embodiments, the prism 1105 may move the reflective surface 1107 of the light reflective material in the third direction (e.g., the Z-direction), parallel to an extending direction of the central axis 1106.

The OPFE 1110 may include, for example, an optical lens including m (here, m is a natural number) groups. The m lenses may move in the second direction Y to change an optical zoom ratio of the camera module 1100*b*. For example, if a basic optical zoom ratio of the camera module 1100*b* is Z, in the case of moving m optical lenses included in the OPFE 1110, the optical zoom ratio of the camera module 1100*b* may be changed to an optical zoom ratio of 3Z or 5Z or 7Z or higher.

The actuator 1130 may move the OPFE 1110 or an optical lens (hereinafter, referred to as an optical lens) to a specific position. For example, the actuator 1130 may adjust a position of the optical lens so that an image sensor 1142 is located at a focal length of the optical lens for accurate sensing.

The imaging device 1140 may include an image sensor 1142, a control logic 1144, and a memory 1146. The image sensor 1142 may sense an image of a sensing target using light L provided through an optical lens. The control logic 1144 may control an overall operation of the camera module 1100b. For example, the control logic 1144 may control the operation of the camera module 1100b according to a control signal provided through a control signal line CSLb.

The memory 1146 may store information necessary for the operation of the camera module 1100b, such as calibration data 1147. The calibration data 1147 may include information necessary for the camera module 1100b to generate image data using the light L provided from the outside. The calibration data 1147 may include, for example, information on a degree of rotation, information on a focal length, information on an optical axis, and the like, described above. When the camera module 1100b is implemented in the form of a multi-state camera in which the focal length is changed according to a position of the optical lens, the calibration data 1147 may include a focal length value for each position (or state) of the optical lens and information related to autofocusing.

The storage device 1150 may store image data sensed by the image sensor 1142. The storage device 1150 may be disposed outside the imaging device 1140, and may be implemented in a stacked form with a sensor chip constituting the imaging device 1140. In some example embodiments, the storage device 1150 may be implemented as an electrically erasable programmable read-only memory (EEPROM), but example embodiments are not limited thereto.

Referring to FIGS. 14 and 15, each of the plurality of camera modules 1100a, 1100b, and 1100c may include an actuator 1130. Accordingly, each of the plurality of camera modules 1100a, 1100b, and 1100c may include the same or different calibration data 1147 according to the operation of the actuator 1130 included therein. In some example embodiments, one camera module (e.g., 1100b) among the plurality of camera modules 1100a, 1100b, and 1100c may be a camera module in the form of a folded lens including the prism 1105 and the OPFE 1110 described above and the other camera modules (e.g., 1100a and 1100b) may be camera modules in a vertical form in which the prism 1105 and the OPFE 1110 are not included, but example embodiments are not limited thereto.

In some example embodiments, one camera module (e.g., 1100c) among the plurality of camera modules 1100a, 1100b, and 1100c may be a depth camera in a vertical form to extract depth information using an infrared ray (IR). In this case, the application processor 1200 may merge image data provided from the depth camera and image data provided from the other camera module (e.g., 1100a or 1100b) to generate a 3D depth image. In some example embodiments, at least two camera modules (e.g., 1100a, 1100b) among the plurality of camera modules 1100a, 1100b, and 1100c may have different fields of view. In this case, for example, optical lenses of at least two camera modules (e.g., 1100a and 1100b) among the plurality of camera modules 1100a, 1100b, and 1100c may be different from each other, but the example embodiments are not limited thereto. Also, in some example embodiments, the respective viewing angles of the plurality of camera modules 1100a, 1100b, and 1100c may be different from each other. In this case, the optical lenses respectively included in the plurality of camera modules 1100a, 1100b, and 1100c may also be different, but the example embodiments are not limited thereto. In some example embodiments, each of the plurality of camera modules 1100a, 1100b, and 1100c may be disposed to be physically separated from each other. That is, the plurality of camera modules 1100a, 1100b, and 1100c may not use a divided sensing region of a single image sensor 1142, but an independent image sensor 1142 may be disposed in each of the plurality of camera modules 1100a, 1100b, and 1100c.

Referring back to FIG. 14, the application processor 1200 may include an image processing device 1210, a memory controller 1220, and an internal memory 1230. The application processor 1200 may be implemented separately from the plurality of camera modules 1100a, 1100b, and 1100c. For example, the application processor 1200 and the plurality of camera modules 1100a, 1100b, and 1100c may be implemented separately as separate semiconductor chips. The image processing device 1210 may include a plurality of sub-image processors 1212a, 1212b, and 1212c, an image generator 1214, and a camera module controller 1216. Also, the image processing device 1210 may include a plurality of sub-image processors 1212a, 1212b, and 1212c corresponding to the number of the plurality of camera modules 1100a, 1100b, and 1100c.

Image data generated from each of the camera modules 1100a, 1100b, and 1100c may be provided to the corresponding sub-image processors 1212a, 1212b, and 1212c through image signal lines ISLa, ISLb, and ISLc separated from each other. For example, image data generated by the camera module 1100a may be provided to the sub-image processor 1212a through the image signal line ISLa, image data generated by the camera module 1100b may be provided to the sub-image processor 1212b trough the image signal line ISLb, and image data generated by the camera module 1100c may be provided to the sub-image processor 1212c through the image signal line ISLc. Such image data transmission may be performed using, for example, a camera serial interface (CSI) based on a mobile industry processor interface (MIPI), but example embodiments are not limited thereto.

In some example embodiments, one sub-image processor may be arranged to correspond to a plurality of camera modules. For example, the sub-image processor 1212a and the sub-image processor 1212c may not be implemented separately from each other as illustrated but may be integrated into one sub-image processor, and the image data provided from the camera module 1100a and the camera module 1100c may be selected through a selection element (e.g., a multiplexer) or the like and then provided to the integrated sub-image processor. The image data provided to each of the sub-image processors 1212a, 1212b, and 1212c may be provided to the image generator 1214. The image generator 1214 may generate an output image using the image data provided from each of the sub-image processors 1212a, 1212b, and 1212c according to image generating information or a mode signal. Specifically, the image generator 1214 may merge at least some of the image data generated by the camera modules 1100a, 1100b, and 1100c having different viewing angles according to the image generating information or the mode signal to generate an output image. In addition, the image generator 1214 may generate an output image by selecting one of image data generated by the camera modules 1100a, 1100b, and/or 1100c having different viewing angles according to the image generating information or the mode signal.

In some example embodiments, the image generating information may include a zoom signal or a zoom factor. Also, in some example embodiments, the mode signal may be, for example, a signal based on a mode selected by the user. When the image generating information is a zoom signal (zoom factor) and each of the camera modules 1100a, 1100b, and 1100c has different viewing fields (viewing angles), the image generator 1214 may perform different operations depending on the type of the zoom signal. For example, if the zoom signal is a first signal, the image generator 1214 may merge image data output from the camera module 1100a and image data output from the camera module 1100c and then generate an output image using the merged image signal and image data output from the camera module 1100b not used for merging. If the zoom signal is a second signal, different from the first signal, the image generator 1214 may not perform such image data merging, and may generate an output image by selecting one of the image data output from each of the camera modules 1100a, 1100b, and/or 1100c. However, example embodiments are not limited thereto, and a method of processing image data may be modified and implemented as needed.

In some example embodiments, the image generator 1214 may receive a plurality of instances (e.g., pieces, articles, units, etc.) of image data having different exposure times from at least one of the plurality of sub-image processors 1212a, 1212b, and/or 1212c, and perform a high dynamic range (HDR) on the plurality of instances of image data, thereby generating merged image data having an increased dynamic range.

The camera module controller 1216 may provide a control signal to each of the camera modules 1100a, 1100b, and 1100c. The control signal generated by the camera module controller 1216 may be provided to the corresponding camera modules 1100a, 1100b, and 1100c respectively through the control signal lines CSLa, CSLb, and CSLc separated from each other. In addition, one of the plurality of camera modules 1100a, 1100b, and/or 1100c may be designated as a master camera (e.g., 1100b) according to the image generating information including a zoom signal or the mode signal, and the other camera modules (e.g., 1100a and 1100c) may be designated as slave cameras. Such information may be included in the control signal and may be provided to the corresponding camera modules 1100a, 1100b, and 1100c through the control signal lines CSLa, CSLb, and CSLc separated from each other.

A camera module operating as a master and a slave may be changed according to a zoom factor or an operation mode signal. For example, when the viewing angle of the camera module 1100a is wider than that of the camera module 1100b and the zoom factor indicates a low zoom ratio, the camera module 1100b may operate as a master and the camera module 1100a may operate as a slave. Conversely, when the zoom factor indicates a high zoom ratio, the camera module 1100a may operate as a master and the camera module 1100b may operate as a slave.

In some example embodiments, the control signal provided from the camera module controller 1216 to each of the camera modules 1100a, 1100b, and 1100c may include a sync enable signal. For example, when the camera module 1100b is a master camera and the camera modules 1100a and 1100c are slave cameras, the camera module controller 1216 may transmit the sync enable signal to the camera module 1100b. The camera module 1100b receiving the sync enable signal may generate a sync signal based on the received sync enable signal, and transmit the generated sync signal to the camera modules 1100a and 1100c through a sync signal line SSL. The camera module 1100b and the camera modules 1100a and 1100c may be synchronized with the sync signal to transmit image data to the application processor 1200.

In some example embodiments, the control signal provided from the camera module controller 1216 to the plurality of camera modules 1100a, 1100b, and 1100c may include mode information according to the mode signal. Based on the mode information, the plurality of camera modules 1100a, 1100b, and 1100c may operate in a first operation mode and a second operation mode in relation to a sensing rate.

The plurality of camera modules 1100a, 1100b, and 1100c may generate an image signal at a first rate (e.g., generate an image signal at a first frame rate) in the first operation mode, encode the generated image signal at a second rate higher than the first rate (e.g., encode the image signal at a second frame rate higher than the first frame rate), and transmit the encoded image signal to the application processor 1200. In this case, the second rate may be 30 times or less of the first rate.

The application processor 1200 may store the received image signal, that is, the encoded image signal, in the internal memory 1230 provided therein or the external memory 1400 outside the application processor 1200, and thereafter, decode the encoded image signal from the internal memory 1230 or the external memory 1400, and display image data generated based on the decoded image signal. For example, a corresponding sub-processor, among the plurality of sub-image processors 1212a, 1212b, and 1212c of the image processing device 1210, may perform decoding, and may also perform image processing on the decoded image signal.

The plurality of camera modules 1100a, 1100b, and 1100c may generate an image signal at a third rate, lower than the first rate, in the second operation mode (e.g., an image signal at a third frame rate lower than the first frame rate) and transmit the image signal to the application processor 1200. The image signal provided to the application processor 1200 may be a signal which has not been encoded. The application processor 1200 may perform image processing on the received image signal or store the image signal in the internal memory 1230 or the external memory 1400.

The PMIC 1300 may supply power, e.g., a power voltage, to each of the plurality of camera modules 1100a, 1100b, and 1100c. For example, the PMIC 1300 may supply first power to the camera module 1100a through the power signal line PSLa, supply second power to the camera module 1100b through the power signal line PSLb, and supply third power to the camera module 1100c through the power signal line PSLc under the control of the application processor 1200. The PMIC 1300 may generate power corresponding to each of the plurality of camera modules 1100a, 1100b, and 1100c in response to a power control signal PCON from the application processor 1200, and also adjust a level of power. The power control signal PCON may include a power adjustment signal for each operation mode of the plurality of camera modules 1100a, 1100b, and 1100c. For example, the operation mode may include a low power mode, and in this case, the power control signal PCON may include information on a camera module operating in the low power mode and a set power level. Levels of powers respectively provided to the plurality of camera modules 1100a, 1100b, and 1100c may be the same or different from each other. Also, the levels of the powers may be changed dynamically.

As described herein, any devices, electronic devices, modules, units, controllers, circuits, camera modules, image sensors, and/or portions thereof according to any of the example embodiments, and/or any portions thereof (including, without limitation, apparatus 10, mobile device 100, camera module 110, transparent display device 200, display panel 210, test device 300, apparatus 20, test device 300a, transparent display devices 201 to 20k, apparatus 30, test device 300b, jig board 100b, transparent display device(s) 200b, electronic device 1000, application processor 1200, image processing device 1210, image generator 1214, sub-image processors 1212*a*, 1212*b*, 1212*c*, camera module controller 1216, memory controller 1220, PMIC 1300, external memory 1400, internal memory 1230, imaging device 1140, control logic 1144, image sensor 1142, or the like) may include, may be included in, and/or may be implemented by one or more instances of processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a graphics processing unit (GPU), an application processor (AP), a digital signal processor (DSP), a microcomputer, a field programmable gate array (FPGA), and programmable logic unit, a microprocessor, application-specific integrated circuit (ASIC), a neural network processing unit (NPU), an Electronic Control Unit (ECU), an Image Signal Processor (ISP), and the like. In some example embodiments, the processing circuitry may include a non-transitory computer readable storage device (e.g., a memory), for example a solid state drive (SSD), storing a program of instructions, and a processor (e.g., CPU) configured to execute the program of instructions to implement the functionality and/or methods performed by some or all of any devices, electronic devices, modules, controllers, units, camera modules, image sensors, and/or portions thereof according to any of the example embodiments, and/or any portions thereof, including any of the methods shown in FIGS. 3, 4, 6, 8, 10, 11.

Any of the memories described herein, including, without limitation, internal memory 1230, external memory 1400, memory 1146, and/or storage device 1150 may be a non-transitory computer readable medium and may store a program of instructions. Any of the memories described herein may be a nonvolatile memory, such as a flash memory, a phase-change random access memory (PRAM), a magneto-resistive RAM (MRAM), a resistive RAM (Re-RAM), or a ferro-electric RAM (FRAM), or a volatile memory, such as a static RAM (SRAM), a dynamic RAM (DRAM), or a synchronous DRAM (SDRAM).

Since the camera module evaluating apparatus according to some example embodiments of the present inventive concepts may apply a custom object image to a transparent display panel (e.g., to be displayed by the transparent display panel), various AF tests may be performed. For example, the camera module evaluating apparatus may measure AF performance using horizontal/vertical/slash/back-slash directional objects and various objects and charts. In addition, the camera module evaluating apparatus according to some example embodiments of the present inventive concepts may perform Bokeh evaluation using near/far control. In addition, the camera module evaluating apparatus according to some example embodiments of the present inventive concepts may review motion artifacts by providing a constant motion to the transparent display panel in an HDR environment.

The camera module evaluating apparatus according to some example embodiments of the present inventive concepts may automate manual tests that are vulnerable to human errors such as AF and HDR motion performed at a set level using a transparent display panel. That is, the camera module evaluating apparatus of the present inventive concepts may derive reliable evaluation data by securing the same and accurate test conditions. In addition, the camera module evaluating apparatus of the present inventive concepts may shorten an evaluation time. In addition, the camera module evaluating apparatus of the present inventive concepts may establish a test standard. That is, the present inventive concepts may automate the entire process of testing and result analysis that was repeatedly performed by a human using a transparent display and SW.

A camera module evaluating apparatus and an operating method thereof according to some example embodiments of the present inventive concepts may automate a test operation for a camera module by using a transparent display device, and thus perform evaluation with high reliability. For example, based on the camera module evaluating apparatus including a transparent display device and a second object, such as a chart, where the transparent display device is positioned between the second object and a camera module-bearing mobile device held in the camera module evaluating apparatus, such that the apparatus is configured to enable the second object to be visible to the camera module of the mobile device through the transparent display device, the camera module evaluating apparatus may be configured to enable the camera module to capture images and/or attempt to focus on object displayed at different distances (e.g., an object displayed by the nearer transparent display device and/or a more distant object visible through the transparent display device. Based on being configured to enable the camera module to image and/or attempt to focus on objects at different distances, while the camera module is in a fixed position, based on providing a nearer object to be imaged via the nearer transparent display device, and further enabling the transparent display device to become transparent to enable the more distant object to be imaged through the transparent display device, and being configured to quickly repeat operations without changing test conditions such as camera module position by simply controlling transparency and/or object display by a transparent display device, the camera module evaluating apparatus may have improved ability to perform test operations to test operation of the camera module (e.g., testing autofocus functionality of the camera module) with improved reliability (test conditions being easily repeated based on the camera module being in a fixed position, and the control of which objects are imaged by the camera module based on controlling at least one transparent display device). Thus, the camera module evaluating apparatus may be configured to more reliably generate accurate and reliable test results indicating a condition of the camera module. In addition, the camera module evaluating apparatus and the operating method thereof according to some example embodiments of the present inventive concepts may reduce an evaluation time, for example based on being configured to enable rapid switching of the camera module between imaging/focusing on objects at different distances based on controlling object display and/or transparency of a transparent display device which may be between the camera module and a second object to be imaged through the transparent display device, and further enabling rapid repeating of operations by quickly switching transparency and/or object display by one or more transparent display devices. Accordingly, the camera module evaluating apparatus may be configured to perform test operations more quickly and thus may have improved functionality. In addition, the camera module evaluating apparatus and the operating method thereof according to some example embodiments of the present inventive concepts may be used to establish a test standard.

A camera module evaluating apparatus and an operating method thereof according to some example embodiments of the present inventive concepts may automate a test operation for a camera module by using a transparent display device, and thus perform evaluation with high reliability.

In some example embodiments, a camera module evaluating apparatus according to any of the example embodiments may enable selective determination of acceptability of a camera module, which may be used to selectively accept/fail the camera module. For example, referring to the method shown in FIG. 4, based on a value of the pass/fail number output at S190 and/or the pass/fail number stored at S150, a determination may be made regarding whether the camera module and/or the mobile device including same has passed or failed the test operation (e.g., AF pass/fail). As noted above, the AF test result may include an AF pass/fail status, which may indicate whether the camera module and/or mobile device including same has passed or failed the test operation. A camera module and/or mobile device including same determined to pass the test operation may be selectively forwarded to be provided as a completed manufactured product. A failed camera module may be removed from the mobile device, such that a replacement camera module is installed in the mobile device. Alternatively, when the camera module is determined to fail a test operation performed by the camera module evaluating apparatus, the mobile device that includes the camera module may be selectively excluded from being forwarded to be provided as a completed manufactured product, and the mobile device (and/or one or more mobile devices represented by the mobile device being tested by camera module evaluating apparatus) may be re-directed to a repair or refurbishment process wherein the camera module(s) of the mobile device (s) may be repaired, refurbished, and/or replaced and may be returned to the camera module evaluating apparatus for a repeat of the test operation, thereby preventing mobile devices with camera modules that fail a test operation from being provided as completed manufacturing products and thus improving the overall reliability of completed manufacturing products. Alternatively, when the camera module is determined to fail a test operation performed by the camera module evaluating apparatus, the mobile device that includes the camera module may be selectively excluded from being forwarded to be provided as a completed manufactured product, and the mobile device (and/or one or more mobile devices represented by the mobile device being tested by camera module evaluating apparatus) may be selectively discarded, thereby preventing mobile devices with camera modules that fail a test operation from being provided as completed manufacturing products and thus improving the overall reliability of completed manufacturing products.

While example embodiments have been illustrated and described above, it will be apparent to those skilled in the art that modifications and variations could be made without departing from the scope of the present inventive concepts as defined by the appended claims.

What is claimed is:

1. An apparatus for evaluating a camera module, the apparatus comprising:
a mobile device configured to include the camera module;
a transparent display device configured to display an object at a transparent display panel based on converting electrical information into visual information;
a chart positioned farther from the mobile device than the transparent display device, the chart configured to display a long-distance object; and
a test device configured to perform an autofocusing (AF) test operation on the camera module based on the camera module capturing an image of the object,
wherein the test device is configured to control the transparent display device to adjust between displaying the object at the transparent display panel to be visible to the camera module and causing the transparent display panel to be transparent to cause the chart to be visible to the camera module through the transparent display device.

2. The apparatus of claim 1, wherein the chart is implemented as an electronic chart.

3. The apparatus of claim 1, wherein the AF test operation includes
an operation of outputting the object to the transparent display panel of the transparent display device,
an operation of making the transparent display panel transparent at a particular time, and
an operation of measuring a time for which the camera module focuses the long-distance object after the transparent display panel is made transparent.

4. The apparatus of claim 1, wherein the test device is configured to set an AF test repetition number, a transition time of a display, a limit time of the AF test, an object image, or an object reproduction time.

5. The apparatus of claim 1, wherein the test device is configured to perform AF performance evaluation after receiving, from the camera module, at least one of an AF pass/fail, an AF pass/fail counting time, an AF test average time, or a video file.

* * * * *